INVENTOR:
TUURE TAPIO MIETTINEN

United States Patent Office
3,715,966
Patented Feb. 13, 1973

3,715,966
LAPPING ANTICONDENSATION VENTILATION FOR WINDOWS OF VEHICLES
Tuure Tapio Miettinen, Oulu, Finland
Filed Apr. 30, 1971, Ser. No. 138,970
Int. Cl. B60h 1/24
U.S. Cl. 98—2.18
6 Claims

ABSTRACT OF THE DISCLOSURE

A lapping anticondensation ventilation system to prevent the condensation of moisture on the windows of vehicles, thus improving the traffic safety and the convenience of motoring. The lapping system uses for ventilation of windows fresh, normally heated air, the relative humidity of which will not increase upon its admixture with exhaled air. The flow will take place along the windows by the shortest path under a pressure gradient produced by an air distribution channel running around the lower edges of the windows and by a suction channel.

BACKGROUND OF THE INVENTION

The lapping anticondensation ventilation system aims at an improvement in preventing the moisture in air from condensing on the windows in the interior of vehicles.

In the prior art so-called flow-through ventilation is used in some cars, in which instance, there are exhaust valves in the rear of the car and in its front part a blower supplying fresh air, whereby efficient turnover of air is ensured. However, this is an unsatisfactory arrangement, because exhaled air with elevated humidity is admixed with the air supplied from the outside. The exhaled air is in fact drawn into the incoming air flow, which is at subatmospheric pressure as a result of its velocity (pursuant to Bernoulli's law of the flow of fluids). The increased humidity of the mixture which comes into contact with the windows results in condensation that is an unfavorable condition.

Other previous efforts to prevent condensation include the use of windows with double panes, which are sometimes found in buses, as well as electric heating by means of a thin, transparent conductive layer or resistance elements in contact with the window pane. Double panes cannot under all circumstances prevent the air, which contains exhaled air, from touching the windows and condensing on them.

Electric heating devices, again, impair the visibility. It is also a fact that their action is delayed when one first starts to drive while the windows are still cold.

The problem of condensation arising from the mixing of the air exhaled by passengers in the vehicle with the air supplied from outside to the window ventilation is solved by this invention.

BRIEF SUMMARY OF THE INVENTION

The lapping anticondensation ventilation for windows of vehicles is intended to prevent the windows in vehicles from becoming steamed over. In prior systems, exhaled air with elevated humidity is admixed to the air supplied from the outside. Such mixing occurs because the exhaled air is drawn into the coming air flow. This is due to subatmospheric pressure of the air stream, owing to its velocity (Bernoulli's law).

The flow-along ventilation system of this invention comprises an air-supplying channel, which runs around the vehicle, following the lower edges of the windows. The channel is perforated, with its perforations facing upwardly. The air taken from outside, and which may be heated is forced into the channel under slight pressure, and flows from the perforation along the window its flow is promoted by suction in the upper part of the system. This upper part, too, is a perforated channel running around the vehicle at the upper edges of the windows, and its perforations facing downwardly. The slight vacuum required for achieving a suction effect is preferably achieved by separate motor-driven means in order that the ventilation might also operate when the vehicle is stationary. The pressure conditions are adjusted so that the pressure in the suction channel is slightly lower than the pressure, reduced by the velocity, in the stream flowing from the perforations. Thereby, the exhaled air in the vehicle will move sooner straight towards the suction channel than to the inlet stream. In order to compensate for this displacement of air in the vehicle, additional air ports connected to the main ventilation blower are located on the sides of the floor of the vehicle. By this location the additional air ports counteract the turbulence which might arise from the drag effect of the stream flowing past the windows. The additional ports, which simultaneously serve the purpose of general ventilation, may also constitute a perforated channel, its openings pointing upwards.

DESCRIPTION OF THE PREFERRED EMBODIMENTS

Figure 1:
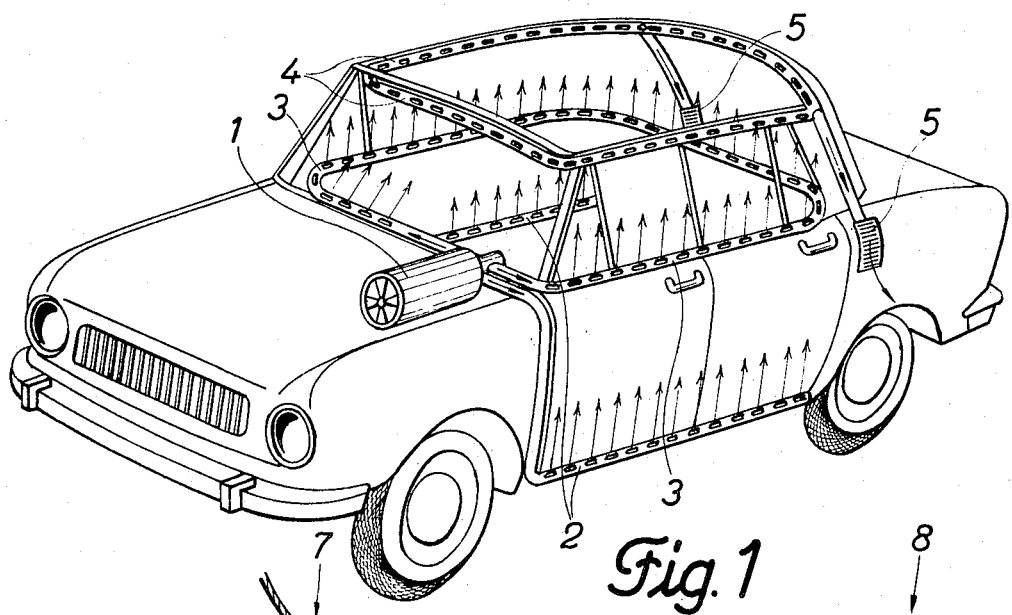
FIG. 1 is an overall perspective view, presenting an application of a vehicle furnished with lapping ventilation.

In FIG. 1 there is shown a vehicle furnished with the lapping ventilation system of this invention. There is an air-supplying channel 3 running around the vehicle at the lower edges of the windows. The channel, which is preferably thermally lagged, is perforated with the perforation pointing upwardly. In the exemplary case the half-length of this channel loop is about 9 feet and its perforation (in the half-loop) consists of about 25 openings with the spacing between openings being about 4 in. The cross-sectional area of this channel 3 is about 16 square inches and the area of one opening is about 0.16 sq. in. Thus the ratio of the area of the channel 3 cross-section to the total area of openings is 4:1. The shape of the channel's cross-section is arbitrary to a reasonable extent, as is that shape of the openings, a square channel cross-section and circular openings constituting a starting basis.

The suction channel loop 4 has a half-length of about 8 ft. with its perforation pointing downwardly which may include about 25 openings, spaced at about 4 inches. The dimensions and shapes of the suction channel and of the openings are equivalent to those of the input channel, i.e., the cross-sectional area of the suction channel is about 16 sq. in., and the area of one opening is about 0.16 sq. in.

Additional pair of channels 2 on both sides of the floor of the vehicle are intended for general ventilation and for a degree of counteraction of turbulence in the stream flowing past the windows. The channels 2 are of the same type as channel 3. The number of openings is about 15, each about 0.16 sq. in. in area, and the cross-sectional area of the channel 2 is about 10 sq. in. The openings also point upwardly.

The blower 1 supplies fresh air into channels 2 and 3 and may be either of propeller or centrifugal type. The blower 1 may include a radiator. The power rating of the blower 1 is partly determined by the pressure needed to produce the velocity of the stream discharging from the perforations and, to a very great extent, by dynamic losses. If a moderate velocity of discharge of e.g. 6 ft. per second through the perforation is desired, a pressure of about $40 \times 10^{-6}$ atmospheres (40 microbars) is needed in the channels. Accordingly, a blower with electrical power rating of about 50 watts is required, and this should also be able to urge the flow through the radiator.

The pairs of air channels 2 and 3 are supplied with air by the blower 1, which in the case of a water-cooled engine includes a radiator connected to the cooling water circulation in the case of an air-cooled engine, air heated in its passage past the engine is conducted to the blower. The uppermost channel loop is the suction channel connected to the exhaust units, these being normally motor-operated.

The suction units 5 which are shown as two in number, are in principle of similar design as the input blower and have to handle the same flow, through at a velocity higher than that of the input flow in a ratio of 40:23. However, since there is no radiator in this path, the task is accomplished with 40 watts total power.

Figure 2:
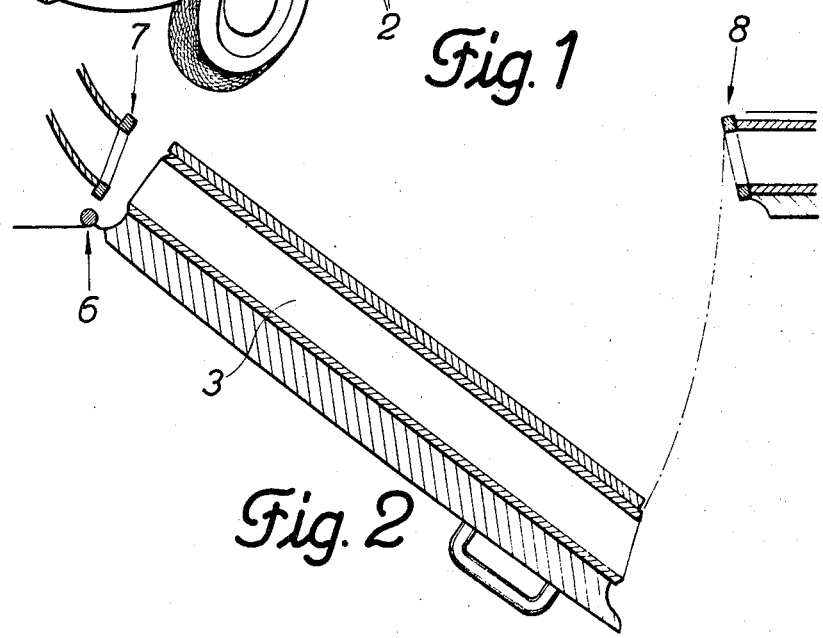
FIG. 2 and 3 are detail views presented in section, showing the input channel, which runs past a door, along the lower edge of the window. Rubber packings are fitted to seal the points where the channel enters the doorposts.
Figure 3:
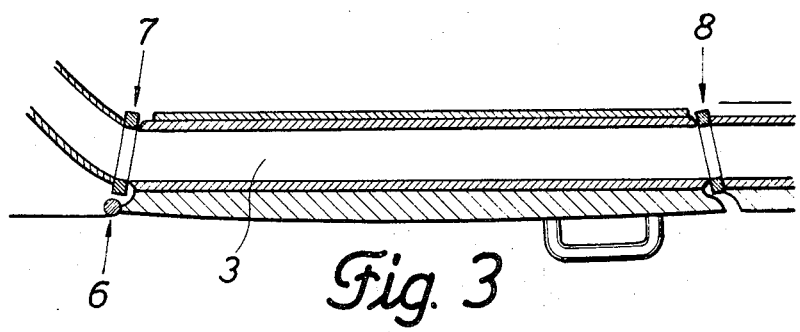

In FIGS. 2 and 3, details of FIG. 1 are seen on enlarged scale, illustrating the manner in which the channel 3 is carried past a door. Reference numeral 6 indicates the hinge of the door. At the post, where the hinges are located, sealing of the channel 3 is readily accomplished by providing on the end of the incoming channel rubber sealings 7 and 8, against which the next section of the channel, which is embedded in the door, is mounted to press lightly when the door is closed on the opposite post a rubber sealing of the same type is used. Light pressure upon the sealing 7, 8 has been achieved by bevelling the ends of the channel sections so that the sealing 7, 8 will be urged against the channel section embedded in the door when the closing mechanism shuts the door. The bevel is about 10 degrees. FIG. 2a shows these details when the door is open, while FIG. 3 shows the same when the door is closed.

Obviously, the embodiment shown is exemplary only and a wide variety of embodiments may be devised without departing from the spirit and scope thereof.

What is claimed is:

1. An anticondensation system for vehicles comprising an air blower means; a first channel system means having perforations and being connected to said first blower means, said first channel system running substantially around the lower portion of said vehicle and about the lower edge of the windows of said vehicle and a second channel system having perforations, said second channel system being adaptable for running substantially around the upper portion of said vehicle and about the upper edge of the windows and connected to outlet ports on said vehicle for removing air from said vehicle, whereby the first channel system provides for the ventilation of the vehicle simultaneously as the second channel provides for an anticondensation action.

2. The anticondensation system of claim 1 including sealing means for the channels in the doors of said vehicle to provide a continuous circuit.

3. The anticondensation system of claim 1 wherein said air blower means supplies fresh air.

4. The anticondensation system of claim 1 including an exhaust blower means connected to said outlet ports.

5. In an automative vehicle an anticondensation system comprising a fresh air blower means a first channel system having ports and being connected to said fresh air blower means, said first channel system being located substantially around said vehicle and about the lower edge of the windows of said vehicle for supplying fresh air; a second channel system having ports, said second channel system being located substantially around the upper portion of said vehicle and about the upper edge of the windows of said vehicle, and exhaust means for removing air from said vehicle through said second channel system, whereby the first channel system provides for the ventilation of the vehicle simultaneously as the second channel provides for an anticondensation action.

6. The system of claim 5 wherein said exhaust means is a blower means.

References Cited

UNITED STATES PATENTS

| | | | |
|---|---|---|---|
| 2,523,923 | 9/1950 | Rodert | 98—2.04 |
| 2,294,363 | 10/1942 | Brockway | 98—2.18 |
| 2,150,110 | 3/1939 | Strauss | 98—2.04 |
| 2,610,567 | 10/1952 | Davis | 98—10 |
| 3,602,126 | 8/1971 | Breitschwerdt | 98—2.04 |

MEYER PERLIN, Primary Examiner

U.S. Cl. X.R.

98—2.19, 10